United States Patent
Khan et al.

(10) Patent No.: US 10,867,187 B2
(45) Date of Patent: Dec. 15, 2020

(54) VISUAL-BASED SECURITY COMPLIANCE PROCESSING

(71) Applicant: NCR Corporation, Atlanta, GA (US)

(72) Inventors: Sudip Rahman Khan, Decatur, GA (US); Matthew Robert Burris, Atlanta, GA (US); Christopher John Costello, Suwanee, GA (US); Gregory Joseph Hartl, Atlanta, GA (US)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 16/696,751

(22) Filed: Nov. 26, 2019

(65) Prior Publication Data

US 2020/0327335 A1    Oct. 15, 2020

Related U.S. Application Data

(63) Continuation-in-part of application No. 16/383,089, filed on Apr. 12, 2019.

(51) Int. Cl.
  *G08B 13/00* (2006.01)
  *G06K 9/00* (2006.01)
  *G08B 13/196* (2006.01)

(52) U.S. Cl.
  CPC ..... *G06K 9/00771* (2013.01); *G06K 9/00302* (2013.01); *G06K 9/00369* (2013.01); *G06K 9/00375* (2013.01); *G08B 13/19613* (2013.01)

(58) Field of Classification Search
  CPC .......... G06K 9/00771; G06K 9/00744; G06K 9/00624; G06K 9/00355; G08B 15/00; G08B 13/248; G08B 13/2462; G08B 13/19613; G08B 13/0492; H04L 67/12; H04L 63/1425; H04L 63/08; G04L 63/302; G06Q 50/265; G06Q 30/02; H04N 5/225
  See application file for complete search history.

(56) References Cited

U.S. PATENT DOCUMENTS

| | | | |
|---|---|---|---|
| 10,217,120 B1 * | 2/2019 | Shin | G06Q 10/06393 |
| 2016/0203499 A1 * | 7/2016 | Yamashita | G06Q 30/0201 705/7.29 |
| 2020/0105113 A1 * | 4/2020 | Williams | G06Q 50/265 |

\* cited by examiner

*Primary Examiner* — Toan N Pham
(74) *Attorney, Agent, or Firm* — Schwegman, Lundberg & Woessner

(57) ABSTRACT

Multiple cameras capture videos within a secure room. When individuals are detected as entering the room, identities of the individuals are resolved. When an asset is exposed in a field of view of one of the cameras, the individuals' eye and head movements are tracked from the videos with respect to one another and the asset. Additionally, touches made by any of the individuals on the asset are tracked from the videos. The eye and head movements are correlated with the touches or lack of touches according to a security policy for the asset. Any violations of the security policy are written to a secure audit log for the room and the asset.

20 Claims, 4 Drawing Sheets

VISUAL-BASED SECURITY COMPLIANCE PROCESSING

RELATED APPLICATIONS

This application claims priority to and is a Continuation-In Part of application Ser. No. 16/383,089, filed Apr. 12, 2019, entitled: "Secure Zone Monitor," the disclosure of which is incorporated by reference in its entirety herein and below.

BACKGROUND

Some enterprises have very specific and detailed security procedures with respect to handling a secure asset. This is particularly true in the banking industry. Banks have a security procedure known as "dual control" associated with a requirements for accessing a secure asset. The asset requires that two individuals be present as checks and balances whenever the secure asset is accessed. A written log is also maintained for auditing that identifies the two individuals, time of access, date of access, and reason for access. Both individuals are required to make independent entries in the log and note all movements made to the asset that occurred when inside the secure room.

However, there are additional security procedures instituted by banks during access of a "dual control" asset. The individuals are required to maintain eye contact with one another when inside a room where the secure asset is at, if neither one of the individuals are touching the asset and are not yet close enough to touch the asset. As soon as the individuals are within reaching distance of the asset, they are required to be looking at one another and the asset. If one individual touches the asset, the other individual must be looking at both the asset and the individual that is touching the asset.

Staff often forget these in-room security procedures since only the movements of the asset can reasonably be required to be logged. Moreover, the banks have no real way of knowing whether the in-room security procedures were violated, since most of these procedures rely on the honesty of the staff. Yet, if these security procedures are not maintained, the bank may be exposed to fraud and theft.

Additionally, the maintaining the logs and training the staff to adhere to the security procedures create costs to the banks.

SUMMARY

In various embodiments, methods and a system for visual-based security compliance processing are presented.

According to an embodiment, a method for visual-based security compliance is presented. A first person and a second person are identified as entering a secure area using video analysis of at least one video. A secure asset is determined as having been exposed in the secure area by that least one of the first person and the second person using the at least one video analysis of the video. Behaviors and actions of the first person and second person are tracked with respect to each other and the secure asset using the video analysis of the at least one video and based on a security policy defining at least the behaviors and the actions. At least some of the behaviors and the actions are logged in a security audit log.

DETAILED DESCRIPTION

Figure 1:
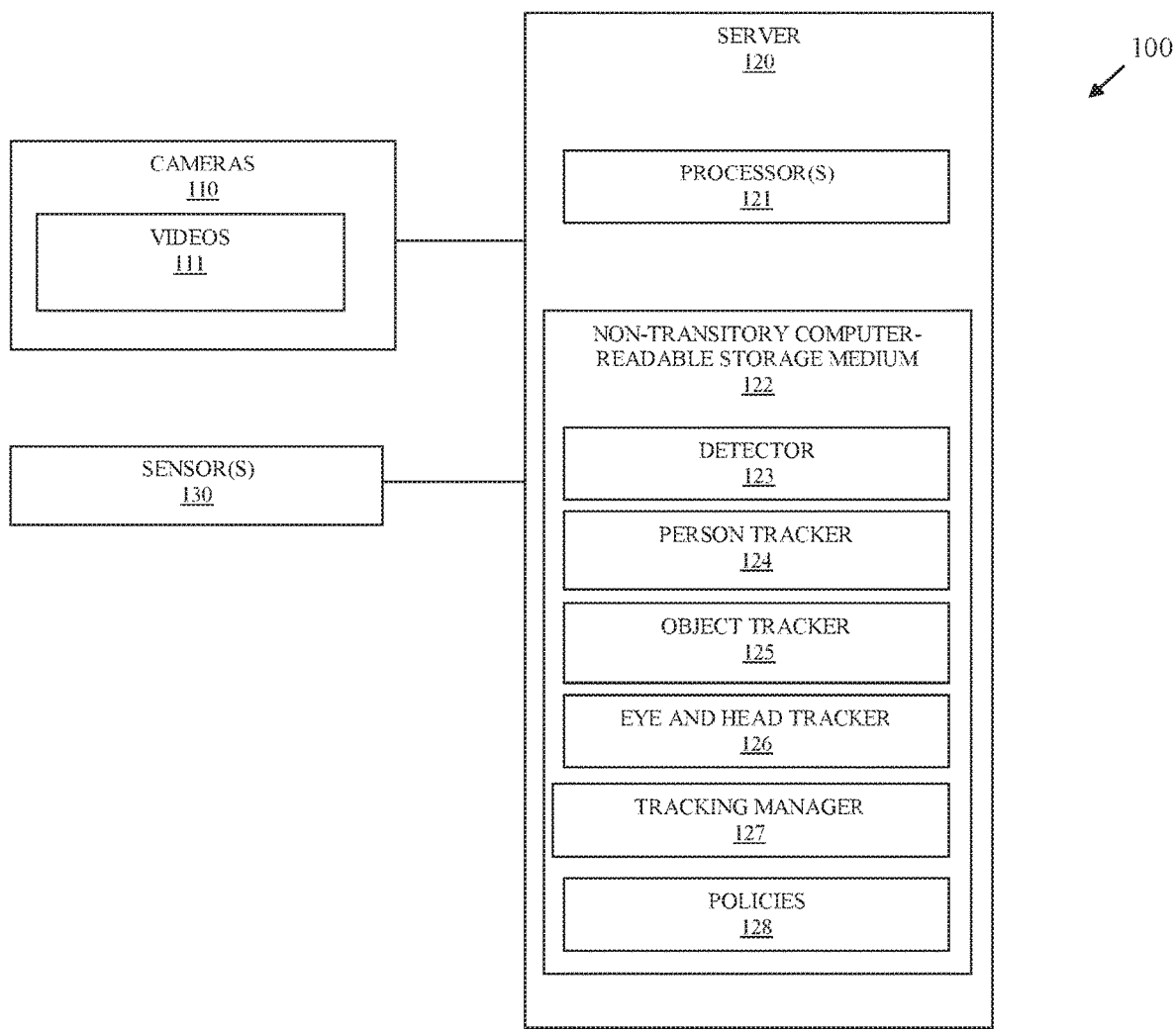
FIG. 1 is a diagram of a system for visual-based security compliance, according to an example embodiment.

FIG. 1 is a diagram of a system 100 for visual-based security compliance according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of visual-based security compliance processing, presented herein and below.

As used herein and below, the terms "user," "personnel," "actor," "person," "individual," and "subject" may be used interchangeably and synonymously. The terms refer to an individual detected within a secure area or a monitored area where one or more secure assets are present.

The term "secure room" refers to a predefined enclosed and access-controlled area of an enterprise that is being monitored within images captured by cameras in real-time video. The entire room may be monitored through the images of the video frames as well as pre-designated objects (secure assets) within portions of the room. The room may require authentication to access or the room may not require authentication to access but requires keys or some other secure access method for entering into the room. Assets within the room are being monitored for auditing, theft-avoidance, or any violation of predefined security policy.

An "object" refers to a secure asset that is being monitored within the images of one or more videos. An object may be a device represented in the images, a log book, a drawer, a desk, a safe, a Point-Of-Sale (POS) terminal, a Self-Service Terminal (SST), an Automated Teller Machine (ATM), a computer monitor, a piece of jewelry, cash, documents, and/or anything of value or having confidential information, etc.

System 100 includes a plurality of cameras 110 that capture time-stamped videos of persons and secure within the secure room. System 100 also includes server 120, and one or more sensor(s) 130. Server 120 includes executable instructions that execute on one or more hardware processors 121 of server 120 from a non-transitory computer-readable storage medium 122 as: detector 123, person tracker 124, object tracker 125, eye and head tracker 126, and tracking manager 127. Non-transitory computer-readable-storage medium 122 also includes security policies 128.

The security policies 128 includes statements of secure room identifiers, secure asset identifiers, and conditions that defines rules. Each rule identifying actions for a given secure room and/or secure asset that is permissible, that is required to be performed, and that is impermissible and should not be performed. Each rule may also include a resource identifier or an action that is to be processed when a given rule is violated. The resource associated with the resource identifier may be an automated application, a system, or an electronic contact address of an individual.

It is to be noted that there may be multiple servers 120, such that the different elements 123-127 may execute on a same server 120 or multiple different servers 120 networked together.

Cameras 110 are preconfigured to capture videos 111 of the secure room based on the field-of-view of the lenses of cameras 110. Some of cameras 110 may capture images 111 representing portions of a different area that a different one of the cameras 110 captures video 111 for. That is, each video 111 can include frames that may overlap multiple ones of the defined areas.

In an embodiment, the secure room includes a variety of different types of cameras 110 that are situated at different angles and heights within the room. Some cameras 110 may be at waist level or head level to an average sized person and directed in different directions upward or downward slightly for purposes of capturing the eyes of individuals within the room. Additionally, there is at least one overhead camera 110 within the room. The overhead camera 110 may be a two-dimensional camera whereas the waist level cameras 110 may be three-dimensional cameras. The cameras 110 may be specifically calibrated to capture eyes and downward movements of the individuals made to touch an asset.

Initially, cameras 110 are situated in locations throughout the secure room (such as a bank vault but can be other rooms associated with enterprises or even rooms of a consumers home). Each camera lens configured to cover one or more predefined areas of the physical space of the room.

Furthermore, metadata is assigned to each camera 110 to include a unique camera identifier, a location identifier (representing the physical location that camera 110 is situated within the room), and one or more area identifiers (representing the predefined areas that the lens of camera 110 captures in the video 111).

Detector 123 raises an event when a subject or set of subjects is/are detected within a secure room of the enterprise. This can be done in a variety of manners, such as through motion sensors 130 (which may or may not be integrated into cameras 110), through an alert indicating from a security system that authentication was granted to an individual to access a secure room, temperature sensors 130 located within the secure room, etc.

Person tracker 124 utilizes the videos 111 to create regions of interest that uniquely identifies each individual from the videos and an area around that individual account for a reach from an extremity (arm) of the individual. These regions of interest are tracked from frame to frame within each of the videos.

Object tracker 125 utilizes a similar video analysis technique for the secure asset and structures within the secure room, such as a table, floor, chair, drawers, etc. Object tracker 125 is responsible for identifying the secure asset and its region of interest.

Any overlap between an individual's region of interest and the assets region of interest indicates a touch being made to the asset, additionally movement of the asset and the individuals are identifiable from the regions of interest relative to known background pixels associated with the secure room and its structures.

Eye and head tracker 127 uses the region of interest for the individuals to do further analysis on each individual for purposes of determining each individuals head movements, head position, head direction, and eye direction. Eye and head tracker 127 may use a pose estimation algorithm for purposes of identifying and track each individual's head within the that individual's region of interest from the videos 111. An iris tracking algorithm can be used on the head-based pixels to identify the eyes and the direction of the eyes. Additionally, the head and eye features may be used to derive facial features that can be hashed into a biometric value, which can then be used to uniquely obtain the identities of the individuals within the secure room.

Tracking manager 127 receives location information relative to each individual/person within the room, pose information, eye directions, head positions of the persons from person tracker 124 and eye and head tracker 126. Tracking manager 127 also receives location information for the asset. Tracking manager 127 also obtains a security policy 128 or set of policies 128 for both the asset and the room. Tracking manager then determines behaviors of the individuals based on poses and eye directions of the heads and the eyes and the location of the asset and determines actions, such as when the asset is touched, held, or moved within the room. These behaviors and actions are associated with identifiers which are embedded in conditions of the rules for the policy 128. The policies may also provide processing actions that are to be performed when a given condition or rule evaluates to true or false.

A variety of processing actions can be defined with the rules of the policies, such as sending an alert to a resource (automated application, system, or electronic messaging address of a human resource), sending an alert to cause an alarm to go off within the establishment and/or room, sending an alarm to security personnel, writing behaviors or actions in a security audit log, and others.

Each camera 110 provides time stamp and image-frame stamped video 111 to server 120. This video 111 can be streamed over a wired or wireless connection between cameras 110 and server 120 to a commonly accessible storage area on server 120 that is accessible to person tracker 124, object tracker 123, action tracker 126, and audit-notification manager 127.

Each accessible video frame of each video 111 includes its metadata (minimally including what was discussed above) with its video frame on the server 120.

When an event is raised that corresponds to "Subject-Detected" by detector 123, the event is raised and manager 127 causes the video 111 to start recording on server 120. Person tracker 124 also detects the raised event and begins evaluating the video frames being streamed and recorded on the server 120 to identify and track subjects/individuals present in the video frames. Regions of interest for each individual are identified and passed by person tracker 124 to eye and head tracker 126. Eye and head tracker 126 processes a pose estimation and iris recognition algorithms on the regions of interest and determines positions of heads, directions of eyes for the persons. Similarly, and simultaneously, object tracker 125 actively analyzing the video frames to identify and track the location and position of the asset within the room. Output from trackers 124-126 is fed to manager 127. Manager 127 obtains the appropriate policy 128 or policies 128 and determines behavior and action identifiers for the individuals with respect to each other and the asset. The behavior and action identifiers are substituted into the conditions of the rules for the policies and the appropriate processing actions are performed.

When person tracker 124 reports that the person or all persons being tracked have left the secure room, manager 127 creates one or more video clips from the videos 111 taken of the individuals while in the room. The manager 127 creates one or more reference links to the video clips and logs the reference links into the secure log with the log entries generated by the processing actions of the policies 128.

One now appreciates how system 100 can be used as a real-time visual-based compliance and security monitor and tracker that can augment or replace traditional handwritten auditing procedures of secure rooms and secure assets. The personnel/individuals may not be required to make manual written entries into security logs as this is achieved with accuracy and without error by system 100. Moreover, non-compliant actions that are deemed severe may have corresponding processing actions embedded in the rules of the policies that cause manager 127 to provide real-time alerts and notifications, such that breaches can be addressed in near real-time by the enterprise. Additionally, in-room security procedures for "dual control" can be enforced and audited without relying on trust of the individuals to properly follow the dual-control security procedures.

A variety of scenarios are possible with system 100 some of which but not all of which are now discussed.

Person tracker 124 may be equipped with biometric recognition, such that facial features of the individuals being tracked can be derived from the pixels of the video frames and matched to a registered individual or the enterprise. An enterprise identifier for the individual may then be recorded within the security log with the security log entries. Person tracker 124 may utilize eye and head tracker 126 for performing facial recognition.

It is noted that other biometric features may be used as well, such as and my way of example only, a fingerprint provided by a security system indicating that the individual was authenticated for access to the secure area, a retina scan, a digit distance and length measurement, a palm reader, a voice print (captured by a microphone), etc. Additionally, features from the video 111 do not have to only include facial features and can include any combination of features or a single set of features associated with the individuals: gait, extremity length, height, and/or facial features.

Detector 123 may report the identifier of an individual based on a separately performed authentication processing that a person performed before access to the secure area was granted. This identifier may be an enterprise identifier for the authenticated person and used by person tracker 124. Manager 124 records the identifier with the secure log entries within the security log.

Manager 127 may utilize a variety of sensors 130 after individuals have left the secure room to check that no secure asset or object within the secure room is reporting a condition that requires attention. For example, a safe door of a bank may not have been completely shut when the individual that was in the safe (secure area) was reported as having left the safe. A door sensor 130 can be checked according to the appropriate policy 128 based on an action associated with leaving the secure area. The door sensor 130 reports that the safe door is not completely shut as it should be. A safety deposit box may be unlocked or only have one lock reporting that it is locked when two locks are required. The policy 128 may indicate that an alert to the person that was in the safe or another person should return and address the issue identified.

In an embodiment, system 100 enforces a bank's dual control security policy where when two individuals are in a secure room with an asset, the two individuals must maintain eye contact with one another when the asset is unattended and not within reaching distance of the individuals or in control of one of the individuals. When the asset is within the control of one of the individuals, the individual not in control must maintain eye contact both with the individual having control and the asset.

In an embodiment, manager 127 includes a reporting interface for automatically or custom generating reports for secure area, secure assets, policy violations, specific individuals, etc.

The above-noted embodiments and other embodiments are now discussed with reference to FIGS. 2-4.

Figure 2:
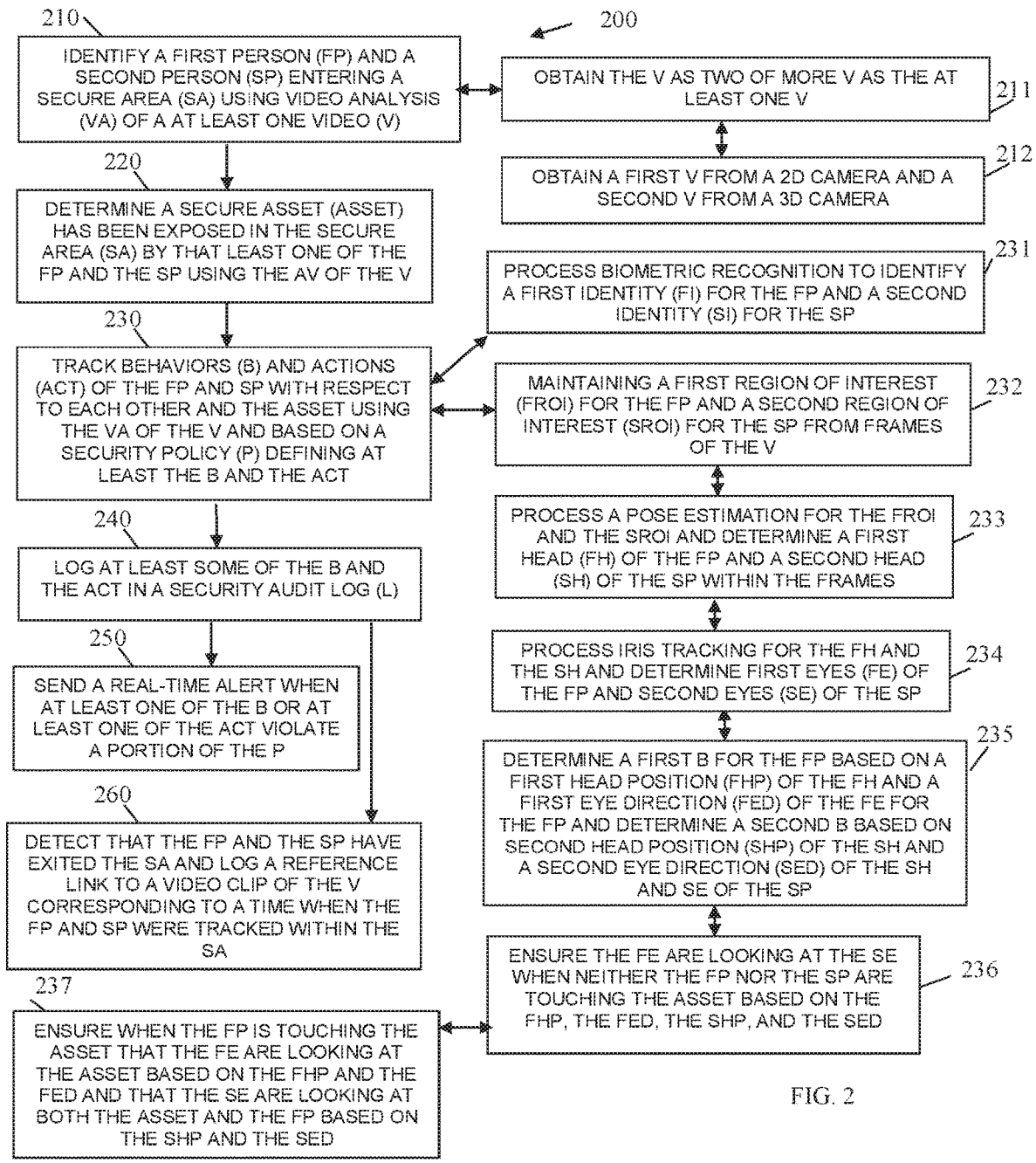
FIG. 2 is a diagram of a method for visual-based security compliance, according to an example embodiment.

FIG. 2 is a diagram of a method 200 for visual-based security compliance processing, according to an example embodiment. The software module(s) that implements the method 200 is referred to as a "secure room monitor." The secure room monitor is implemented as executable instructions programmed and residing within memory and/or a non-transitory computer-readable (processor-readable) storage medium and executed by one or more processors of a device. The processor(s) of the device that executes the secure room monitor are specifically configured and programmed to process the secure room monitor. The secure room monitor may have access to one or more network connections during its processing. The network connections can be wired, wireless, or a combination of wired and wireless.

In an embodiment, the device that executes the secure room monitor is server 120. In an embodiment, server 120 is a cloud-based server, a local-area network (LAN)-based server, or a wide-area network (WAN) server.

In an embodiment, the secure room monitor is all or some combination of: the detector 123, person tracker 124, object tracker 125, eye and head tracker 126, and/or tracking manager 127.

At 210, the secure room monitor identifies a first person and a second person entering a secure area using video analysis of at least one video captured by at least one camera. In an embodiment, the secure area is a secure room of an establishment.

In an embodiment, at 211, the secure room monitor obtains the video as two or more videos, wherein the at least one video is provided by two or more cameras situated at different locations and at different angles with different fields of view within the secure area.

In an embodiment of 211 and at 212, the secure room monitor obtains a first video from a two-dimensional (2D) camera and a second video from a three-dimensional (3D) camera.

At 220, the secure room monitor determines a secure asset has been exposed in the secure area by at least one of the first person and the second person.

At 230, the secure room monitor tracks behaviors and actions of the first person and the second person with respect to each other and the asset using the video analysis of the video(s) and based on a security policy defining at least the behaviors and the actions.

In an embodiment, at 231, the secure room monitor processes a biometric recognition process to identify a first identity for the first person and a second identity for the second person.

In an embodiment, at 232, the secure room monitor maintains a first region of interest for the first person and a second region of interest for the second person from frames of the video(s).

In an embodiment of 232 and at 233, the secure room monitor processes a pose estimation from the first region of interest and the second region of interest and determine a first head of the first person and a second head of the second person within the frames.

In an embodiment of 233 and at 234, the secure room monitor processes an iris tracking algorithm for the first head and the second head and determines first eyes of the first person and second eyes of the second person from the frames of the video(s).

In an embodiment of 234 and at 235, the secure room monitor determines a first behavior for the first person based on a first head position of the first head and a first eye direction of the first eyes for the first person. The secure room monitor also determines a second behavior based on a second head position of the second head and a second eye direction of the second eyes for the second person.

In an embodiment of 235 and at 236, the secure room monitor ensures the first eyes are looking at the second eyes when neither the first person not the second person are touching or within a reachable distance of the asset within the secure area based on the first head position, the first eye direction, the second head position, and the second eye direction.

In an embodiment of 236 and at 237, the secure room monitor ensures when the first person is touching or in control of the asset that the first eyes are looking at the asset based on the first head position and the first eye direction and that the second eyes are looking at both the asset and the first person based on the second head position and the second eye direction.

At 240, the secure room monitor logs at least some of the behaviors and the actions in a security audit log. Identifiers for the first and second persons, an asset identifier for the asset, a secure area identifier for the secure area, a date, and time are also logged in the security audit log.

In an embodiment, at 250, the secure room monitor sends a real-time alert when at least one of the behaviors or at least one of the actions violate a portion of the security policy.

In an embodiment, the secure room monitor detects that the first person and the second person have exited the secure area and logs a reference link to a video clip of the video(s) corresponding to a time when the first person and the second person were tracked as being within the secure area.

Figure 3:
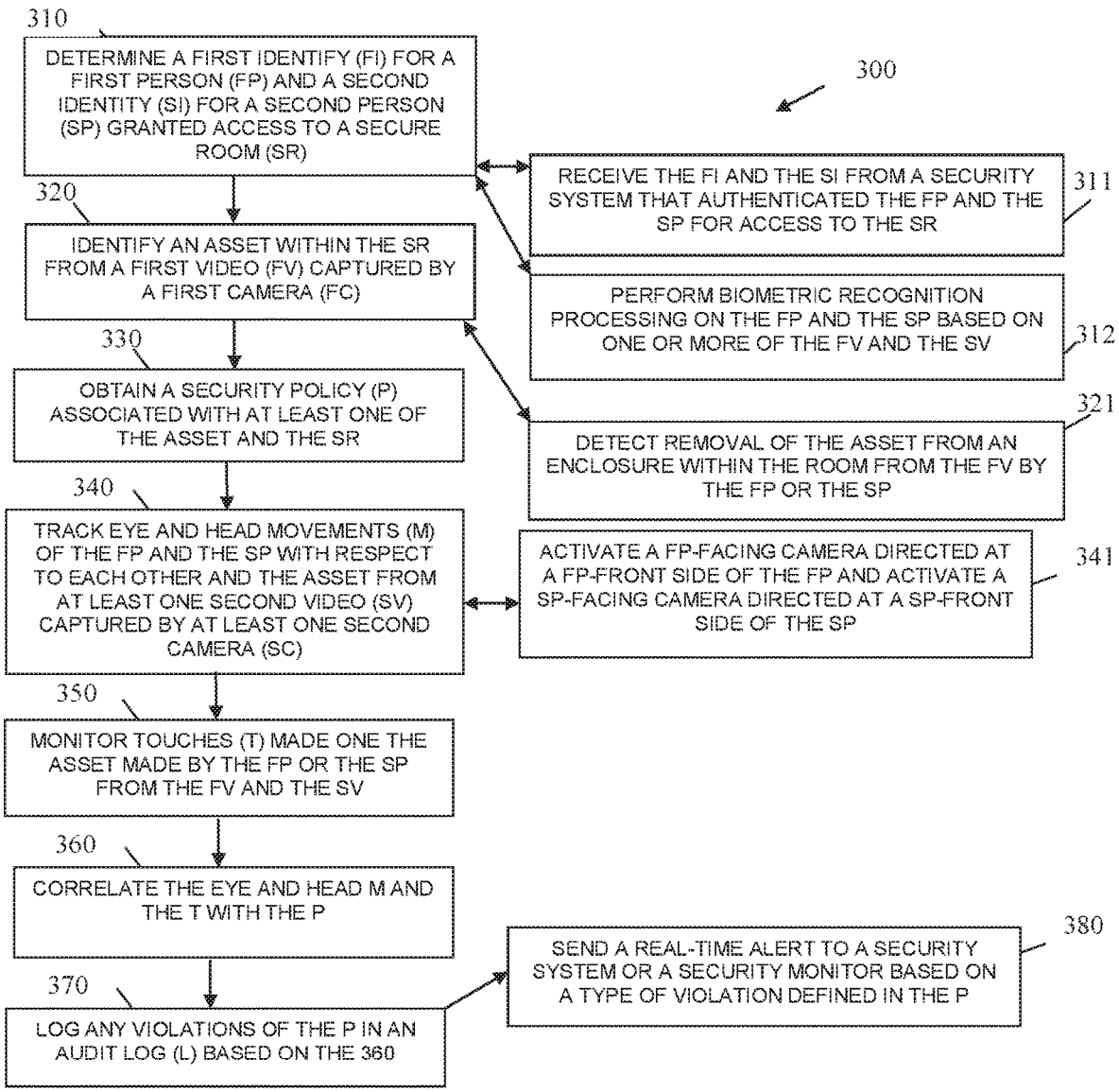
FIG. 3 is a diagram of another method for visual-based security compliance, according to an example embodiment.

FIG. 3 is a diagram of another method 300 for visual-based security compliance processing, according to an example embodiment. The software module(s) that implements the method 300 is referred to as an "dual-control auditor." The dual-control auditor is implemented as executable instructions programmed and residing within memory and/or a non-transitory computer-readable (processor-readable) storage medium and executed by one or more processors of a device. The processors that execute the dual-control auditor are specifically configured and programmed to process the dual-control auditor. The dual-control auditor may have access to one or more network connections during its processing. The network connections can be wired, wireless, or a combination of wired and wireless.

In an embodiment, the device that executes the dual-control auditor is the server 120. In an embodiment, the server 120 is a cloud processing environment, a LAN server, or a WAN server.

In an embodiment, the dual-control auditor is all of or some combination of: detector 123, person tracker 124, object tracker 125, eye and head tracker 126, tracking manager 127, and/or the method 300.

The dual-control auditor presents another and, in some ways, enhanced processing perspective of the method 200 discussed above.

At 310, the dual-control auditor determines a first identity for a first person and a second identity for a second person granted access and within a secure room.

In an embodiment, at 311, the dual-control auditor receives the first identify and the second identity from a security system that authenticated the first person and the second person for access to the secure room.

In an embodiment, at 312, the dual-control auditor performs biometric recognition processing on the first person and the second person based on one or more of a first video and a second video using facial features and/or other biometric features derived from the first and second videos.

At 320, the dual-control auditor identifies an asset within the secure room from the first video that is captured by a first camera.

In an embodiment, at 321, the dual-control auditor detects removal of the asset from an enclosure (drawer, cabinet, safe, etc.) within the secure room from the first video by the first person or the second person.

At 330, the dual-control auditor obtains a security policy associated with one or more of the asset and the secure room.

At 340, the dual-control auditor tracks eye and head movements of the first person and the second person with respect to each other and the asset from at least one second video captured by at least one second camera.

In an embodiment, at 341, the dual-control auditor activates a first-person facing camera directed at a front side of the first person and activates a second-person facing camera directed at a front side of the second person.

At 350, the dual-control auditor monitors touches made or control of the asset that is made by the first person or the second person from the first video and the one or more second videos.

At 360, the dual-control auditor correlates the eyed and head movements and the touches with the security policy.

At 370, the dual-control auditor logs any violations of the security policy in an audit log based on 360.

In an embodiment, at 380, the dual-control auditor sends a real-time alert to a security system or a security monitor based on a type of violation defined in the security policy.

Figure 4:
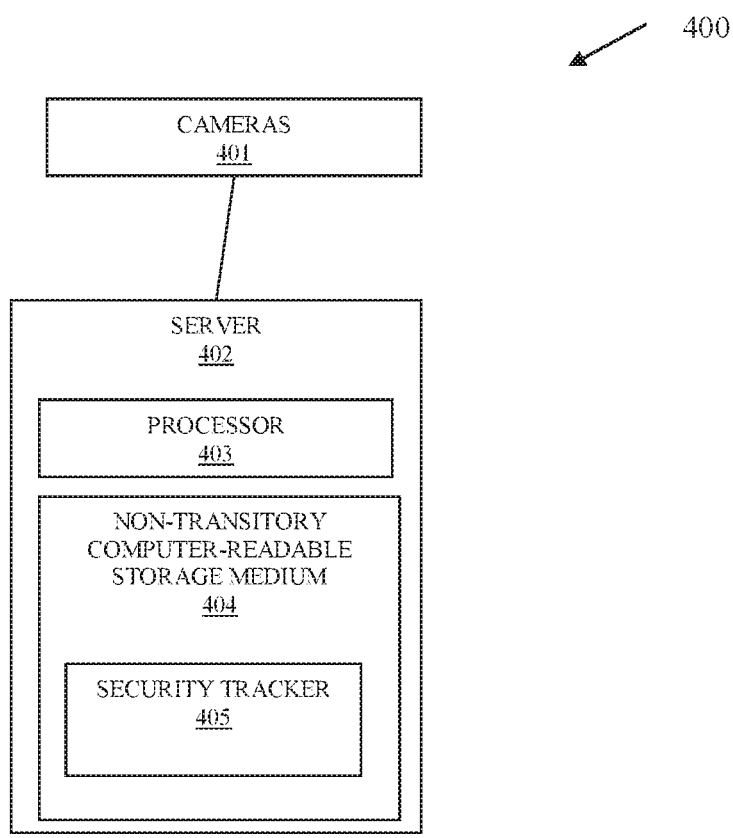
FIG. 4 is a diagram of another system for visual-based security compliance, according to an example embodiment.

FIG. 4 is a diagram of a system 400 for visual-based security compliance processing, according to an example embodiment. The system 400 includes a variety of hardware components and software components. The software components of the system 400 are programmed and reside within memory and/or a non-transitory computer-readable medium and execute on one or more processors of the system 400. The system 400 communicates over one or more networks, which can be wired, wireless, or a combination of wired and wireless.

In an embodiment, the system 400 implements, inter alia, the processing described above with the FIGS. 1-3.

The system 400 includes a plurality cameras 401 and a server 402. The server 402 includes at least one hardware processor 403, a non-transitory computer-readable storage medium 404 having executable instructions representing a security tracker 405.

The security tracker 405 when executed from the non-transitory computer-readable storage medium 404 on the processor 403 is configured to cause the processor 403 to perform processing comprising: 1) determining when a first person and a second person enter the secure room based on a first video captured by a first camera 401; 2) determining a first identity for the first person and a second identity for the second person; 3) determining when an asset was exposed within the secure room from the first video; 3) obtaining a policy based on the asset; 4) activating a second camera 401 to capture second video with a first focus on the first person; 5) activating a third camera 401 to capture third video with a second focus on the second person; 6) monitoring eye, head, and hand movements of the first person and the second person using the first video, the second video, and the third video; and 6) logging in an audit log any violations of the policy based on the eye, head, and hand movements.

In an embodiment, the first camera 401 is a two-dimensional camera, and the second camera 401 and the third camera 401 are three-dimensional cameras.

In an embodiment, the security manager is all of or some combination of: detector 123, person tracker 124, object tracker 125, eye and head tracker 126, tracking manager 127, the method 200, and/or the method 300.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
   identifying, by a secure room monitor, a first person and a second person entering a secure area using video analysis of at least one video;
   determining, by a processor, a secure asset has been exposed in the secure area by at least one of the first person and the second person using the at least one video analysis of the video;
   tracking, by a tracking manager, behaviors and actions of the first person and second person with respect to each other and the secure asset using the video analysis of the at least one video and based on a security policy defining at least the behaviors and the actions; and
   logging, by the processor, at least some of the behaviors and the actions in a security audit log.

2. The method of claim 1 further comprising, sending a real-time alert when at least one of the behaviors or at least one of the actions violate a portion of the security policy.

3. The method of claim 1 further comprising, detecting that the first person and the second person have exited the secure area using video analysis of the at least one video and logging a reference link to a video clip corresponding to a time when the first person and the second person were tracked within the secure area.

4. The method of claim 1, wherein identifying further includes obtaining the video as two or more videos as the at least one video.

5. The method of claim 4, further comprising, obtaining a first video from a two-dimensional camera and a second video from a three-dimensional camera.

6. The method of claim 1, wherein tracking further includes processing biometric recognition to identify a first identity for the first person and a second identity for the second person.

7. The method of claim 1, wherein tracking further includes maintaining a first region of interest for the first person and a second region of interest for the second person from frames of the at least one video.

8. The method of claim 7, wherein maintaining further includes processing a pose estimation algorithm for the first region of interest and the second region of interest and determining a first head for the first person and a second head for the second person within the frames of the last one video.

9. The method of claim 8, wherein processing further includes processing an iris tracking algorithm for the first head and the second head and determining first eyes of the first person and second eyes of the second person.

10. The method of claim 9, wherein processing further includes determining first behavior based on a first head position of the first head and a first eye direction of the first eyes for the first person and determining a second behavior based on a second head position of the second head and a second eye direction of the second eyes for the second person.

11. The method of claim 10, wherein determining further includes ensuring the first eyes are looking at the second eyes when neither the first person nor the second person are touching the secure asset or within a reachable distance of the secure asset based on the first head position, the first eye direction, the second head position, and the second eye direction.

12. The method of claim 11, wherein determining further includes ensuring when the first person is touching the secure asset that the first eyes are looking at the secure asset based on the first head position and the first eye direction and that the second eyes are looking at both the secure asset and the first person based on the second head position and the second eye direction.

13. A method, comprising:
   determining, by a secure room monitor, a first identify for a first person and a second identity for a second person granted access to a secure room;
   identifying, by an object tracker, an asset within the secure room from a first video captured by a first camera;
   obtaining, by a tracking manager, a security policy associated with at least one of the asset and the secure room;
   tracking, by the tracking manager, eye and head movements of the first person and the second person with respect to each other and the asset from at least one second video captured by at least one second camera;
   monitoring, by a dual-control auditor, touches made to the asset made by the first person or the second person from the first video and the at least one second video;
   correlating, by the dual-control auditor, the eye and head movements and the touches with the security policy; and
   logging, by a processor, any violations of the security policy in an audit log based on the correlating.

14. The method of claim 13, wherein determining further includes receiving the first identity and the second identity from a security system that authenticated the first person and the second person for access to the secure room.

15. The method of claim 13, wherein determining further includes performing biometric recognition processing on the first person and the second person based on one or more of the first video and the at least one second video.

16. The method of claim 13, wherein identifying further includes detecting removal of the asset from an enclosure within the room from the first video by the first person or the second person.

17. The method of claim 13, wherein tracking further includes activating a first-person facing camera directed at a first-person front side of the first person and activating a second-person facing camera directed at a second person front side of the second person, wherein the at least one second camera is two cameras.

18. The method of claim 13 further comprising, sending a real-time alert to a security system or a security monitor based on a type of violation defined in the security policy.

19. A system, comprising:
cameras configured to capture videos within a secure room;
a server comprising a processor and a non-transitory computer-readable storage medium;
the non-transitory computer-readable storage medium comprising executable instructions representing a security tracker;
the security tracker when executed on the processor from the non-transitory computer-readable storage medium causing the processor to perform processing comprising:
determining when a first person and a second person enter the secure room based on a first video captured by a first camera;
determining a first identity for the first person and a second identity for the second person;
determining when an asset was exposed within the secure room from the first video;
obtaining a policy based on the asset;
activating a second camera to capture second video with a first focus on the first person;
activating a third camera to capture third video with a second focus on the second person;
monitoring eye, head, and hand movements of the first person and the second person using the first video, the second video, and the third video and
logging in an audit log any violations of the policy based on the eye, head, and hand movements.

20. The system of claim 19, wherein the first camera is a two-dimensional camera, and wherein the second camera and the third camera are three-dimensional cameras.

\* \* \* \* \*